United States Patent
Tong et al.

(10) Patent No.: US 7,924,866 B2
(45) Date of Patent: Apr. 12, 2011

(54) RANDOM ACCESS CHANNEL PROTOCOL

(75) Inventors: Wen Tong, Ottawa (CA); Peiying Zhu, Kanata (CA); Nikita D. Vvedenskaya, Moscow (RU); Nikolai L. Likhanov, Moscow (RU); Sergei P. Fedortsov, Moscow (RU)

(73) Assignee: Nortel Networks Limited, Mississauga, Ontario (CA)

( * ) Notice: Subject to any disclaimer, the term of this patent is extended or adjusted under 35 U.S.C. 154(b) by 1000 days.

(21) Appl. No.: 11/658,123

(22) PCT Filed: Dec. 17, 2003

(86) PCT No.: PCT/RU03/00564
§ 371 (c)(1),
(2), (4) Date: Jan. 22, 2007

(87) PCT Pub. No.: WO2005/060188
PCT Pub. Date: Jun. 30, 2005

(65) Prior Publication Data
US 2008/0279213 A1 Nov. 13, 2008

(51) Int. Cl.
*H04J 3/16* (2006.01)
*H04L 12/413* (2006.01)
*H04W 72/00* (2009.01)

(52) U.S. Cl. ...... 370/437; 370/445; 370/448; 455/452.2

(58) Field of Classification Search ............... 370/320, 370/445, 448, 437; 375/219
See application file for complete search history.

(56) References Cited

U.S. PATENT DOCUMENTS

| | | | | |
|---|---|---|---|---|
| 6,937,641 | B2 * | 8/2005 | Li et al. | 375/141 |
| 7,453,844 | B1 * | 11/2008 | Lee et al. | 370/329 |
| 2002/0154653 | A1 * | 10/2002 | Benveniste | 370/447 |
| 2004/0057400 | A1 * | 3/2004 | Walsh et al. | 370/329 |

OTHER PUBLICATIONS

Deng, Dr. Jiunn; Chang, Ruay-Shiung; "A Priority Scheme for IEEE 802.11 DCF Access Method," IEICE Trans. Commun. vol E82-B, No. 1; Jan. 1999, pp. 95-102.*
Deng, Dr-Jiunn et al., "A Priority Scheme for IEEE 802.11 DCF Access Method," IEICE Trans. Commun., Jan. 1999, pp. 96-102, vol. E82-B, No. 1, Institute of Electronics Information and Comm. Eng., Tokyo, Japan.
Lindgren, Anders et al., "Evaluation of Quality of Service Schemes for IEEE 802.11 Wireless LANs," 26th Annual IEEE Conference on Local Computer Networks, 2001, pp. 348-351, IEEE, Tampa, Florida.
International Search Report from PCT/RU03/00564 mailed Jun. 8, 2005.

* cited by examiner

*Primary Examiner* — Dwayne D Bost
*Assistant Examiner* — Larry Sternbane
(74) *Attorney, Agent, or Firm* — Withrow & Terranova, PLLC

(57) ABSTRACT

The present invention provides an improved random access channel protocol, wherein different user elements may be associated with different priority levels. Based on relative priority, the user elements may have different probabilities for deciding when to retransmit a previously transmitted packet upon receiving information from an access point indicating that the packet needs to be retransmitted. A buffer is provided for storing a packet to transmit, and the buffer is associated with a stack counter, which is incremented or decremented to or from a nominal value to determine when to transmit or retransmit the packet stored in the buffer. Based on the relative priority, feedback information from the access point may cause the stack counter for a packet needing to be retransmitted to stay at the nominal value, wherein retransmission will occur at the next available time slot, or it may increase the stack counter by one or more levels.

30 Claims, 11 Drawing Sheets ns, each packet may be dynamically assigned to different channels on a slot-by-slot basis to enhance the probability of an effective transmission.

The present invention is applicable to both single and multi-channel systems, and preferably requires one feedback message per slot to help control the transmission of new packets and the retransmission of previously transmitted packets. The use of a single feedback message for a multi-channel environment is particularly beneficial in minimizing the complexity of the system. When a single feedback message is used for multiple channels, the feedback information is based on the relative number of successful and unsuccessful transmissions throughout the multiple channels.

The access point and user elements may also cooperate to effectively allocate various channels for access, signaling, and carrying traffic. The allocations may be based on relative packet size, the type of information being sent, or the frequency at which the channels are accessed. In an effort to increase the likelihood of a packet being received, the user elements may transmit redundant packets without relying on the feedback information. For example, redundant packets may be transmitted over different channels, during different time slots, or a combination thereof.

Those skilled in the art will appreciate the scope of the present invention and realize additional aspects thereof after reading the following detailed description of the preferred embodiments in association with the accompanying drawing figures.

RANDOM ACCESS CHANNEL PROTOCOL

The present invention relates to communications, and in particular to an improved random access protocol for multiple access communication systems.

BACKGROUND OF THE INVENTION

Multiple access communication systems in both wired and wireless environments often implement a random access channel protocol, which effectively controls when user elements transmit information to a centralized access point, such as a base station. In general, each of the user elements may attempt to transmit information to the base station during a given slot. If the base station is unable to properly receive the transmitted packets, a generic feedback message is transmitted and received by each of the user elements. Based on the feedback information, the user elements that transmitted information corresponding to the feedback message may take various steps to prepare to retransmit the packet, or transmit a new packet. If the feedback indicates that a message was not received, the user element knows that the packet must be retransmitted, and may implement any number of back-off procedures in order to avoid a conflict with another competing user element during retransmission. Unfortunately, many of these protocols are very inefficient and unstable, especially as the number of user elements competing for channel resources increases. A commonly employed random access channel protocol used in many local and metropolitan area networks incorporating Ethernet, wireless local area network, cellular, and satellite technology is (ALOHA), and in particular, the slotted ALOHA protocol. A major advantage associated with the ALOHA protocol is its simplicity in implementation and use for random, multiple-access networks. However, the key drawback of the ALOHA protocol is its low efficiency and its instability.

Given the ever-increasing demand for more efficient use of communication resources, there is a need for an improved random access channel protocol, which is significantly more efficient and more stable than existing protocols.

SUMMARY OF THE INVENTION

The present invention provides an improved random access channel protocol, wherein different user elements may be associated with different priority levels. Based on a relative priority, the user elements may have different probabilities for deciding when to retransmit a previously transmitted packet upon receiving information from an access point indicating that the packet needs to be retransmitted. A buffer is provided for storing a packet to transmit, and the buffer is associated with a stack counter, which is incremented or decremented to or from a nominal value to determine when to transmit or retransmit the packet stored in the buffer. Based on the relative priority, feedback information from the access point may cause the stack counter for a packet needing to be retransmitted to stay at the nominal value, wherein retransmission will occur at the next available time slot, or it may increase the stack counter by one or more levels. Depending on the priority, the number of levels by which the stack counter may be incremented based on the feedback information may vary. In addition to providing different levels of control of the stack counter, power ramping techniques may be incorporated for retransmissions to improve quality of service, as well as provide further priority. During transmission of sequential pack-

BRIEF DESCRIPTION OF THE DRAWING FIGURES

The accompanying drawing figures incorporated in and forming a part of this specification illustrate several aspects of the invention, and together with the description serve to explain the principles of the invention.

Figure 6:
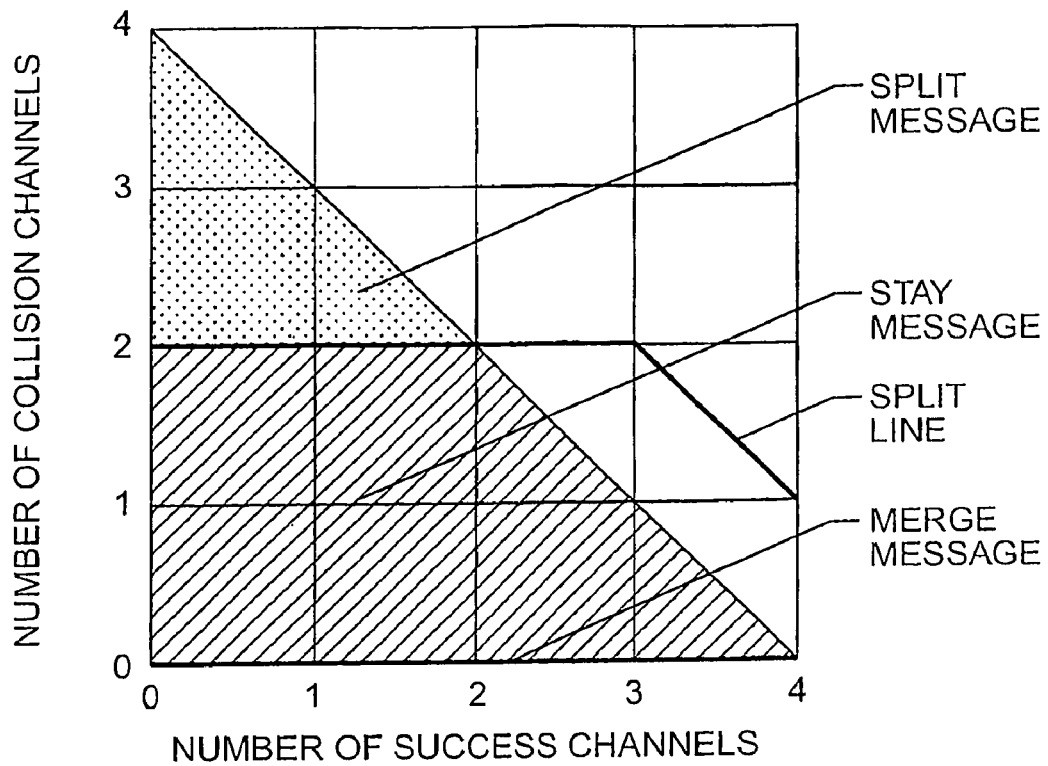
Figure 7:
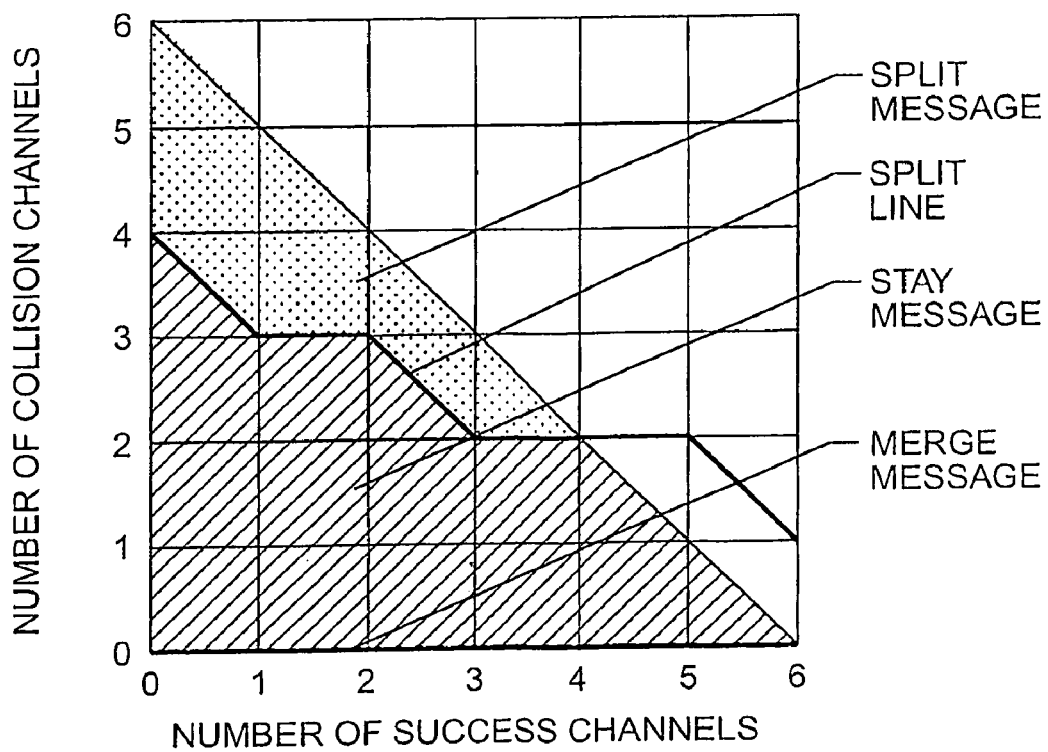
Figure 8:
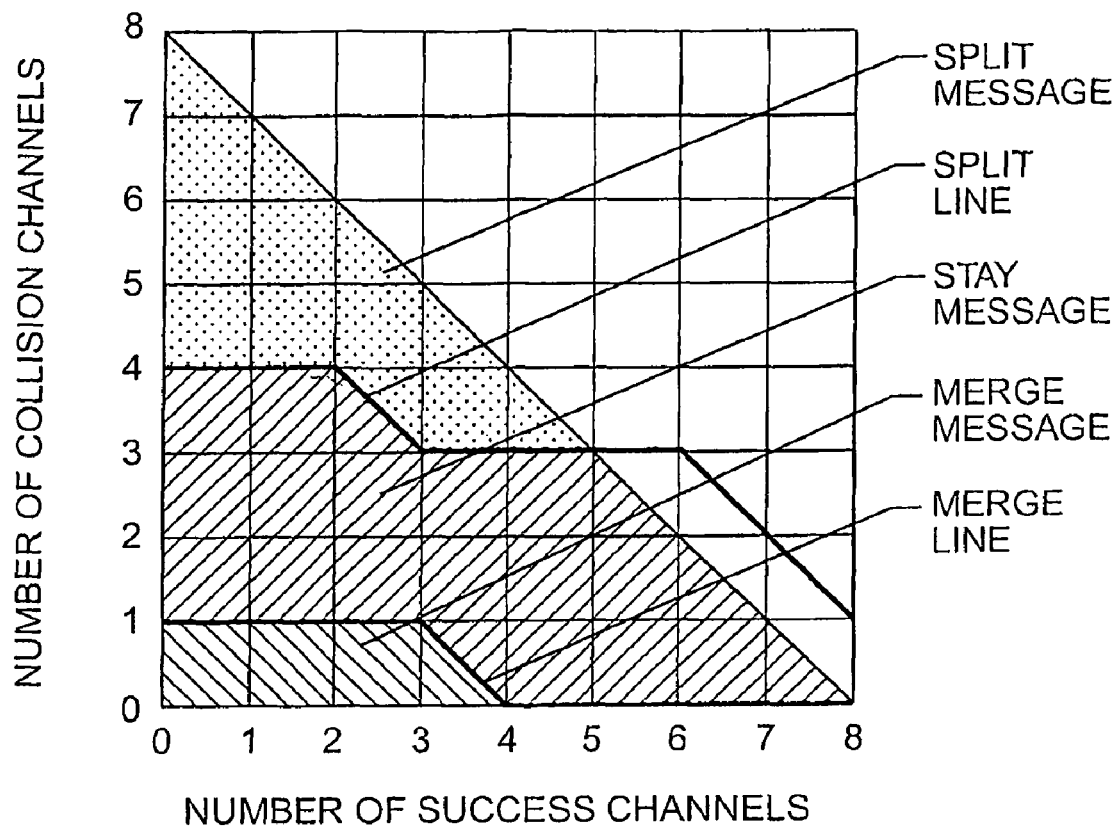

FIGS. 6, 7, and 8 graphically illustrate a feedback information rule according to systems having four, six, and eight channels, respectively, according to select embodiments of the present invention.

FIGS. 9A-9G illustrate various allocation strategies for transmitting redundant, as well as sequential, packets using multiple channels over multiple slots according to select embodiments of the present invention.

Figure 10C:
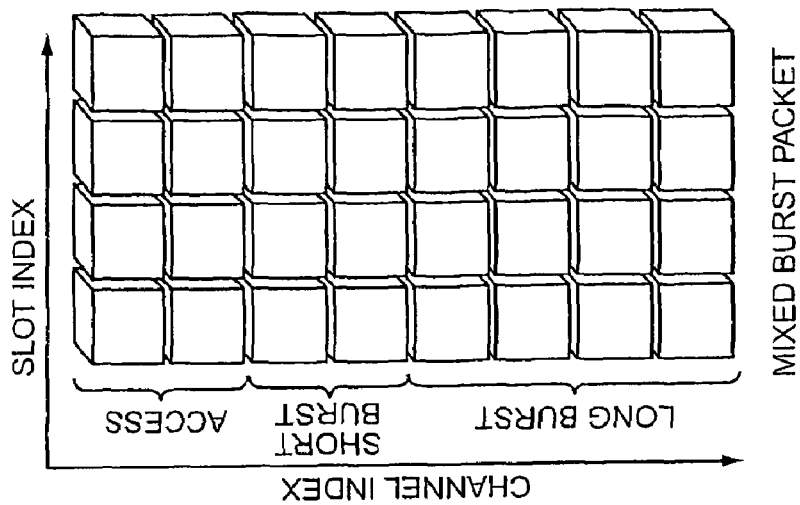
Figure 10B:
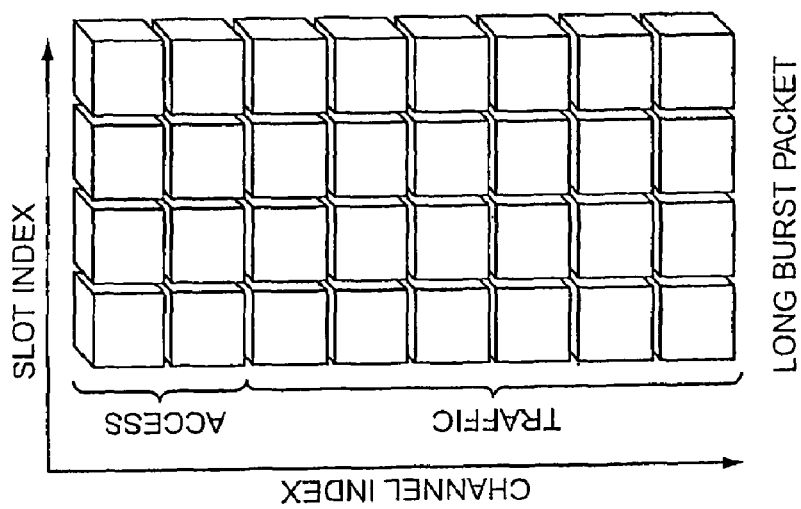
Figure 10A:
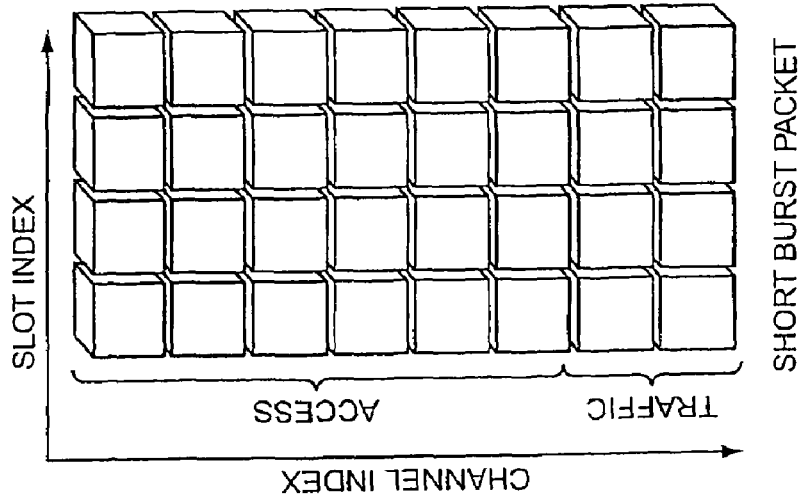

FIGS. 10A-10C illustrate various allocation strategies for allocating traffic and access channels.

Figure 11:
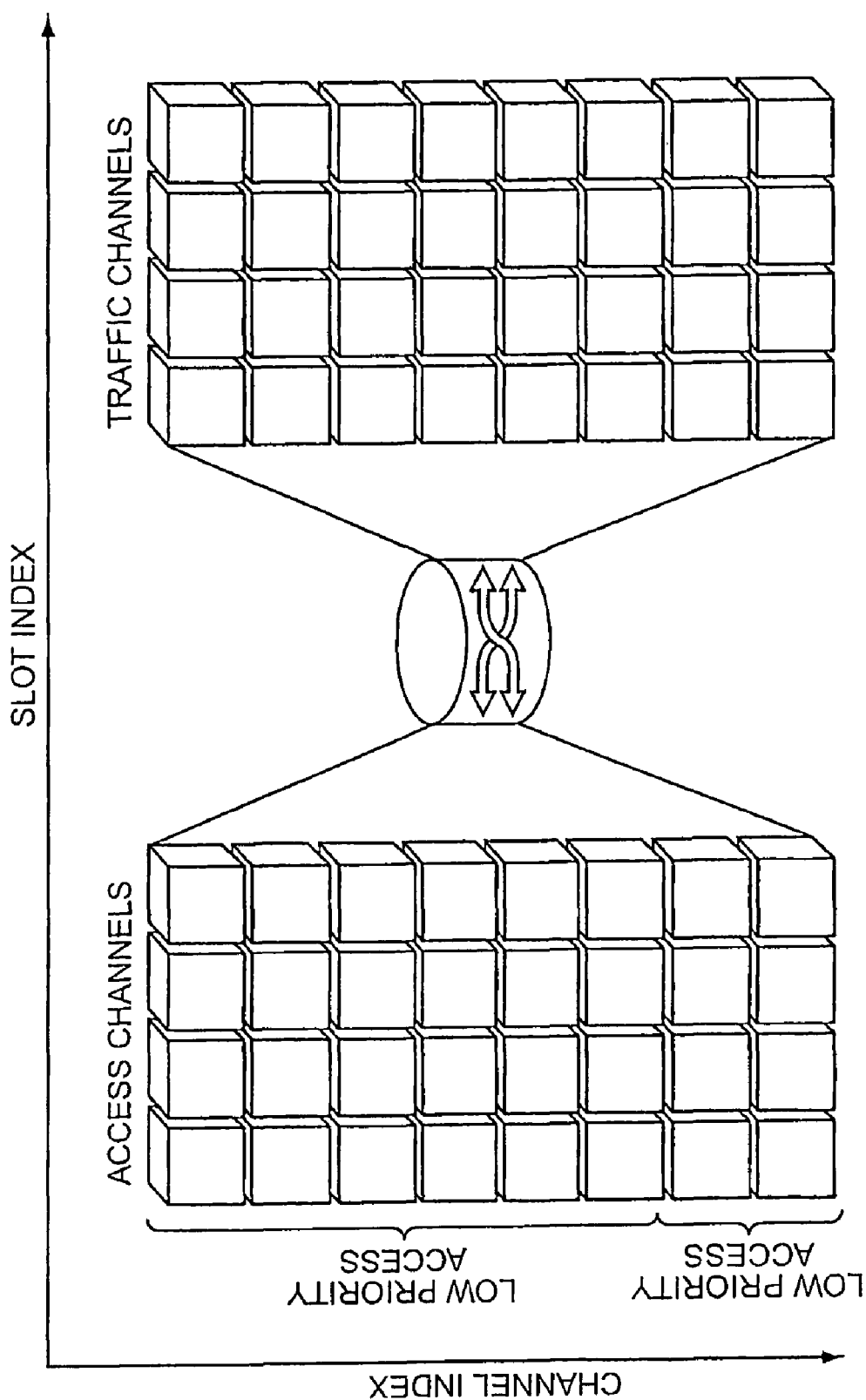

FIG. 11 illustrates a priority access and allocation strategy according to yet another embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
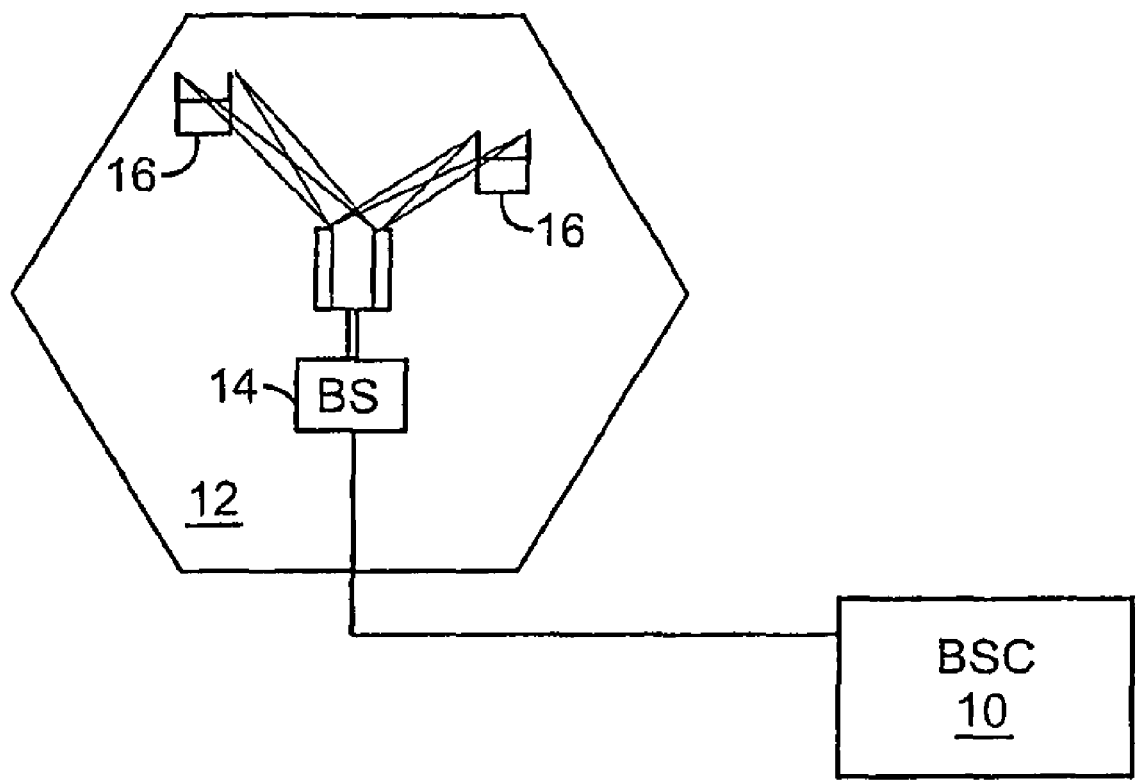
FIG. 1 is a block representation of a wireless communication system according to one embodiment of the present invention.

With reference to FIG. 1, a basic wireless communication environment is illustrated. In general, a base station controller (BSC) 10 controls wireless communications within multiple cells 12, which are served by corresponding base stations (BS) 14. Each base station 14 facilitates communications with user elements 16, which are within the cell 12 associated with the corresponding base station 14. For the present invention, the base stations 14 and user elements 16 include multiple antennas to provide spatial diversity for communications. The base station 14 may be any type of wireless access point for cellular, wireless local area network, or like wireless network. Further, the base station 14 may be a central access point on a wired network.

Figure 2:
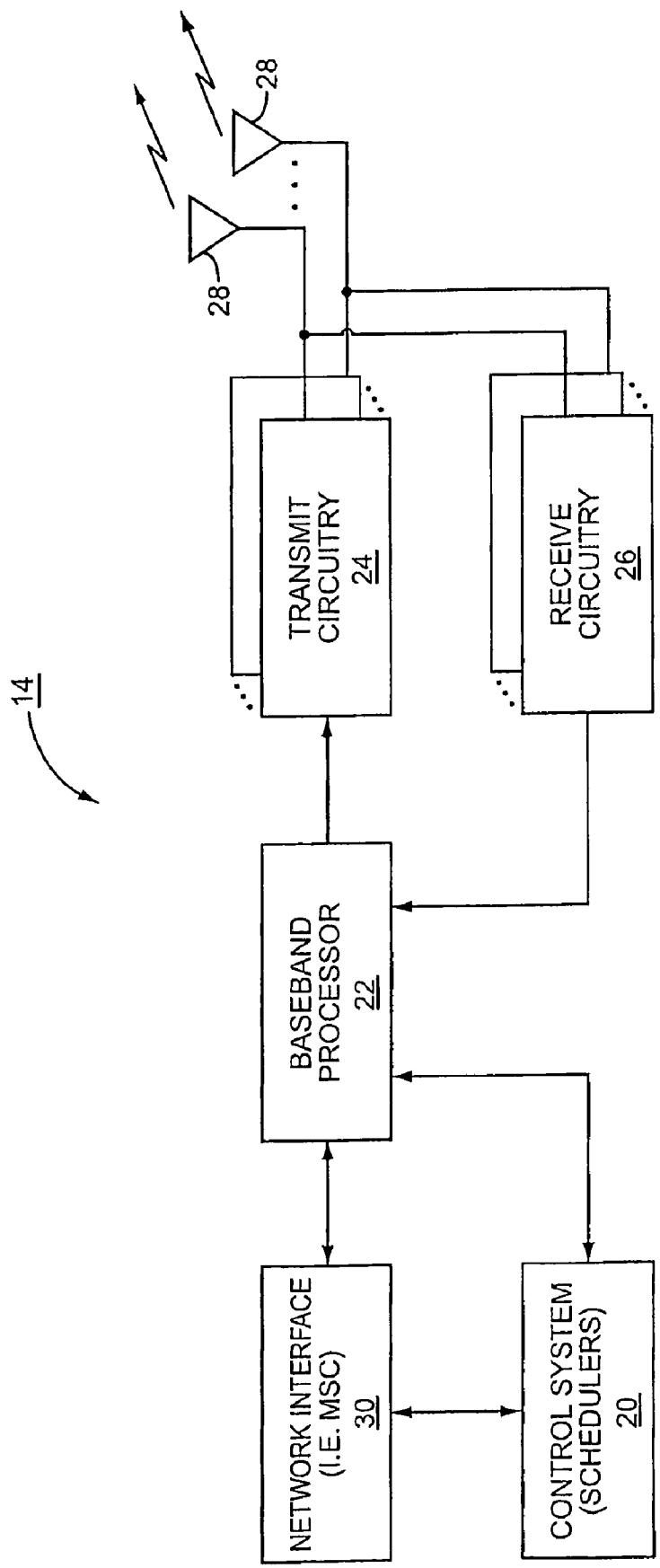
FIG. 2 is a block representation of a base station according to one embodiment of the present invention.

With reference to FIG. 2, a base station 14 configured according to one embodiment of the present invention is illustrated. The base station 14 generally includes a control system 20, a baseband processor 22, transmit circuitry 24, receive circuitry 26, multiple antennas 28 (for wireless embodiments) or a communications interface (for wired embodiments), and a network interface 30. The receive circuitry 26 receives radio frequency signals through antennas 28 bearing information from one or more remote transmitters provided by user elements 16. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs). The received information is then sent across a wireless network via the network interface 30 or transmitted to another user element 16 serviced by the base station 14. The network interface 30 will typically interact with the base station controller 10 and a circuit-switched network forming a part of a wireless network, which may be coupled to the public switched telephone network (PSTN) or other communication network.

On the transmit side, the baseband processor 22 receives digitized data, which may represent voice, data, or control information, from the network interface 30 under the control of the control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). The multiple antennas 28 and the replicated transmit and receive circuitries 24, 26 provide spatial diversity. Antenna selection, modulation, and processing details are described in greater detail below.

Figure 3:
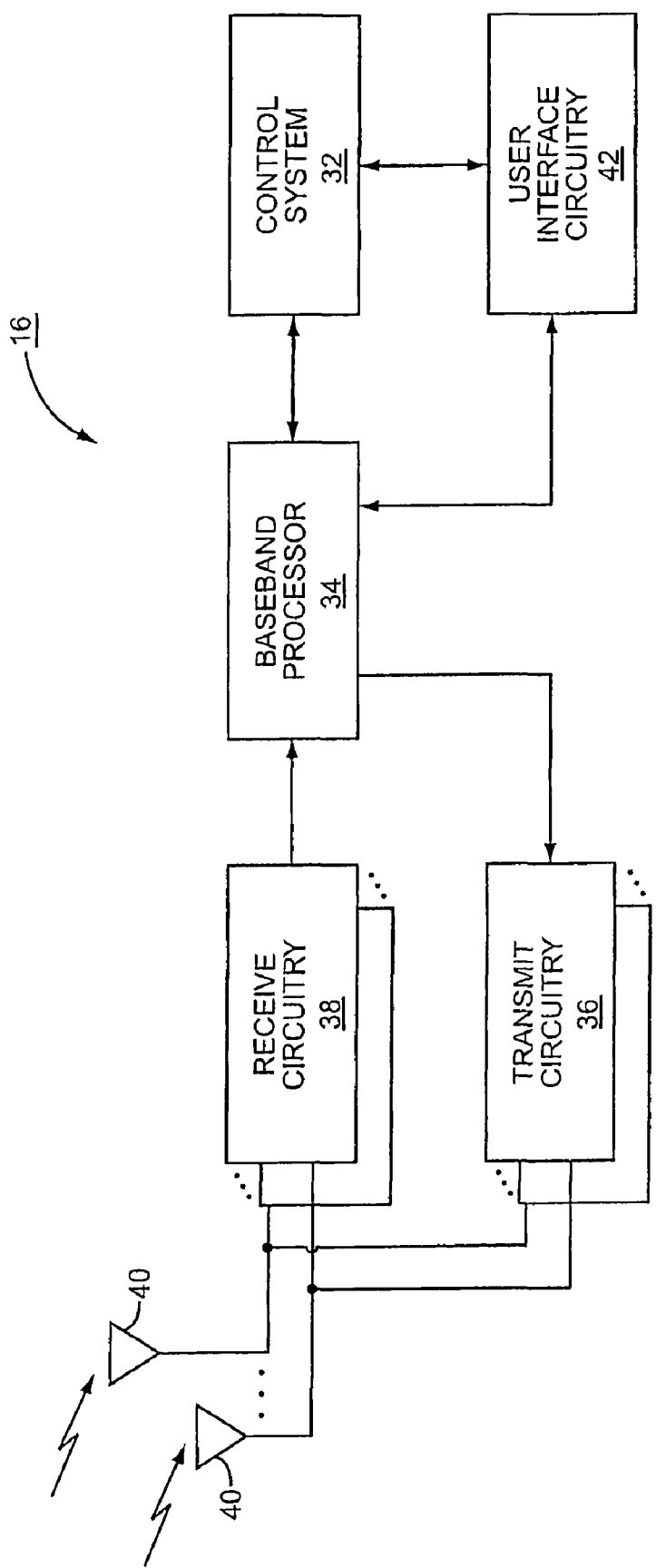
FIG. 3 is a block representation of a user element according to one embodiment of the present invention.

With reference to FIG. 3, a user element 16 configured according to one embodiment of the present invention is illustrated. Similarly to the base station 14, the user element 16 will include a control system 32, a baseband processor 34, transmit circuitry 36, receive circuitry 38, multiple antennas 40 (for wireless embodiments) or a communication interface (for wired embodiments), and user interface circuitry 42. The receive circuitry 38 receives radio frequency signals through antennas 40 bearing information from one or more base stations 14. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations, as will be discussed on greater detail below. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown).

For the following description, the communication architectures are described as being between a base station 14 and a user element 16 in a wireless embodiment, but those skilled in the art will recognize the applicability of the illustrated architecture for both uplink and downlink communications in wired and wireless embodiments. Further, the communications may be facilitated using a variety of multiple access architectures, including, but not limited to Ethernet, wireless LAN, code division multiple access (CDMA), frequency division multiple access (FDMA), time division multiple access (TDMA), and orthogonal frequency division multiplexing (OFDM) access technologies.

As noted, the present invention improves upon existing random access channel protocols, which use a stack algorithm to control the transmission of information from the user element 16 to the base station 14. Since all the user elements 16 being served by a given base station 14 must compete for resources, the random access channel protocol of the present invention significantly improves the efficiency with which each of these user elements 16 contend for these resources. In general, the transmission of information occurs in packets during defined time slots over a given channel or a group of channels, which may be defined by any multiple access technology. Each user element 16 will have a buffer for storing the next packet of information to be transmitted to the base station 14. The packet of information may include the entirety of a traditional packet, which would include both a header (preamble) and a payload (message), or any portion thereof wherein the packet of information may include all or a portion of a header, payload, or combination thereof. Upon successful transmission of the packet of information stored in the buffer, the next packet to be transmitted is then loaded into the buffer. Actual transmission of the packet of information stored in the buffer is based at least in part on the value of an associated stack counter, which represents a relative position in a vertical stack used to prioritize packets of information to be transmitted from all of the competing user elements 16. Thus, the stack counters among the user elements 16 will vary from one slot to another, and will change from one slot to another, if necessary, based on a stack algorithm, which is a function of feedback from the base station 14. Although the stack counter may be oriented in a variety of ways, for purposes of illustration assume that the packet of information is transmitted from the buffer when the counter reaches zero. Also assume that the stack counter will increment or decrement in light of the stack algorithm, which is described in detail below.

Notably, the feedback provided by the base station 14 is generic in nature, and thus, does not specifically identify the packets that were received. The user element 16 must rely on the random access channel protocol to determine whether or not transmitted packets were successfully received, whether transmitted packets need to be retransmitted, and the like. The present invention is applicable to both single and multiple channel systems, and the following description initially outlines the operation of one embodiment of the present invention for a single channel system and then describes another embodiment of the present invention for a multiple channel system.

In one single channel embodiment, assume that the content of the stack counter for a given user element 16 is designated as $L_t$ for a given time slot t and that the base station 14 provides one of three feedback messages for each time slot. The feedback messages provided by the base station 14 may include 1) an idle message indicating that there are no transmissions detected during the slot, 2) a successful transmission message indicating that a packet transmitted during the slot was successfully received, and 3) a collision message indicating that the base station 14 detected that a packet was transmitted, but could not successfully receive the packet. The collision message may be generated when multiple user elements 16 transmit concurrently, wherein the conflicting transmissions interfere with each other sufficiently to prevent the base station 14 from receiving any of the packets, or simply that there is other interference in the channel sufficient to degrade a single transmitted packet enough to prevent the base station 14 from receiving the packet. The proposed stack algorithm for controlling the stack counter ($L_t$) favors a last in first out philosophy. Initially, upon creating a new packet to transmit during time slot t−1, the new packet is placed in the buffer and the associated stack counter is set to zero ($L_t$=0). Assuming the propagation time to receive feedback from the base station 14 is equal to L, wherein L=1, 2, . . . , a user element 16 receives the feedback from the base station 14 by the beginning of slot t+L and any retransmissions based on that feedback signal can take place at time slots t+L, t+2L, . . . .

The specific stack algorithm rule for a first embodiment of the present invention is provided below:
1. If $L_t$=0, then the buffered packet is transmitted in slot t;
2. If $L_t$=0 and the feedback information from the base station 14 for slot t is a success message, the packet is cleared from the buffer and the next packet to be transmitted is placed in the buffer;
3. If $L_t>0$, then the packet is not transmitted during time slot t;
4. If $L_t$=0 and the feedback from the base station 14 is a collision message, then a random number generator is initiated to determine how to manipulate the stack counter:

In an n-level splitting system, the random number generator will generate one of n numbers, which will dictate the manipulation of the stack counter. In a 2-level splitting system, the random number generator will generate one of two numbers, wherein when the first number is generated, the stack counter associated with the buffer for the next available time slot, $L_{t+L}$, will be set to zero, and if the other number is generated, $L_{t+L}$ is set to one, $L_{t+L}$=1. Thus, when $L_{t+L}$=0, the packet is sent during slot t+L. If $L_{t+L}$=1, the packet is not sent during the time slot t+L, and will not be transmitted until the value for $L_{t+L}$ reaches zero, based on manipulation by the stack algorithm and feedback from the base station 14;
5. If $L_t>0$ and the feedback from the base station 14 is a collision message indicating that there was a collision during time slot t, then $L_{t+L}$ is incremented, which pushes the buffered packet further into the stack;
6. If $L_t>0$ and the feedback from the base station 14 is an idle message, then $L_{t+L}$ is decremented;
7. If $L_t>0$ or $L_t$=0 and the feedback from the base station 14 is a receive message, and the user element 16 knows that the base station 14 could not receive one of its packets to generate the receive message, then $L_t$ is decremented.

Figure 4:
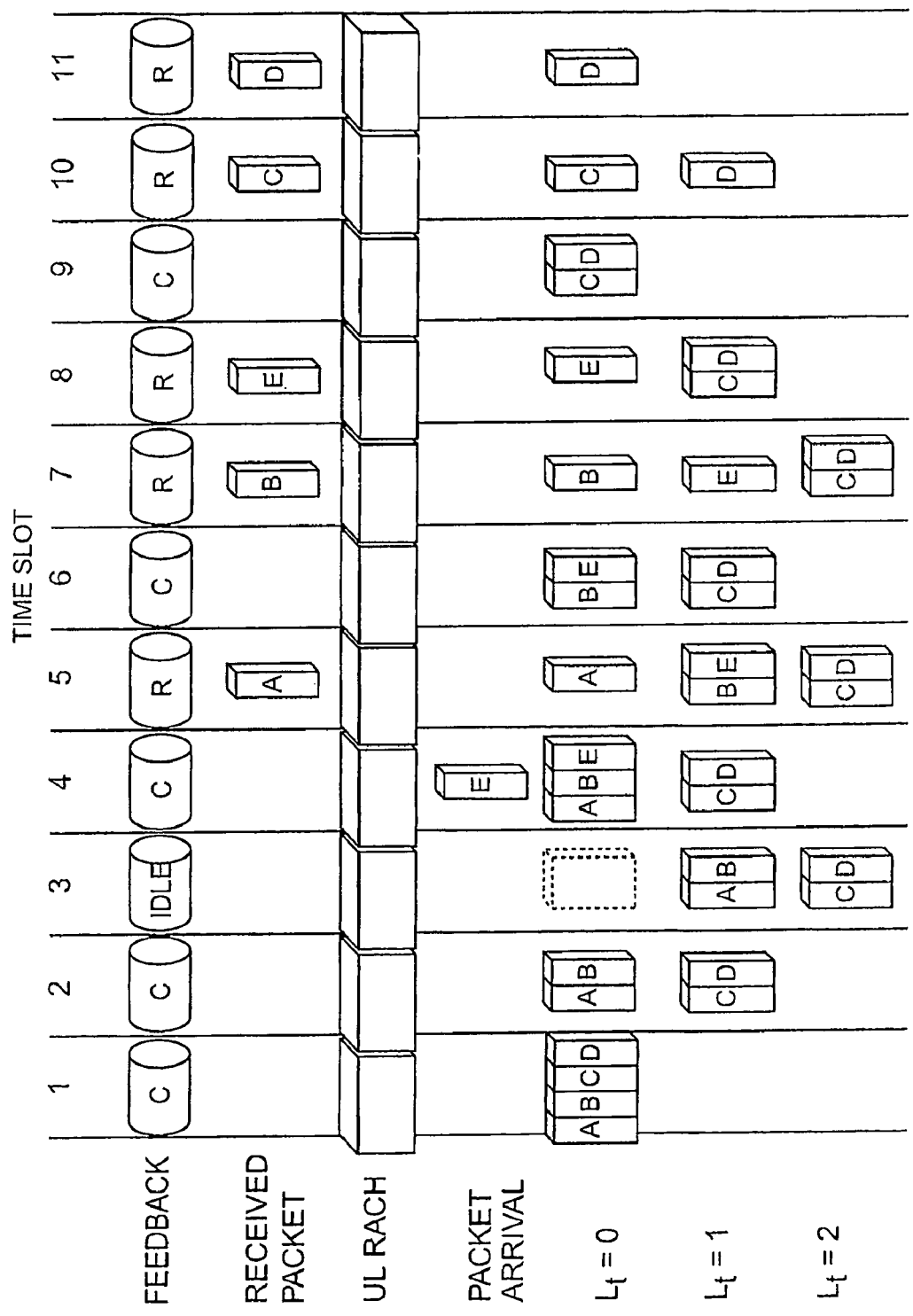
FIG. 4 illustrates the operation of a stack algorithm according to one embodiment of the present invention.

Operation of the above-described stack algorithm is illustrated in FIG. 4. Assume that there are four user elements 16 generally referenced as A, B, C, and D, and that each has a single packet to transmit to the base station 14. Also assume that during time slot 1, the stack counters for each of the user elements 16 are set to zero ($L_t$=0). As such, packets from user elements A, B, C, and D are all transmitted during time slot 1. The simultaneous transmission of these four packets results in the base station 14 being unable to receive any of the packets transmitted from user elements A, B, C, and D, and transmitting a collision message, which is received by each user element A, B, C, and D. Based on the above stack algorithm (rule 4), each user element A, B, C, and D will initiate generation of one of the two random numbers using the random number generator. Assume that the result of each of the user elements A, B, C, and D running the random number generator for generating one of two outcomes results in the stack counter remaining zero ($L_t$=0) for user elements A and B, and the stack counter being set to one ($L_t$=1) for user elements C and D. As such, during time slot 2, user elements A and B will retransmit their respective packets, and user elements C and D will not attempt to retransmit their packets.

Since user elements A and B are transmitting concurrently during time slot 2, the base station 14 is not able to receive either of the packets, and again transmits a collision message, which is received by user elements A, B, C, and D. As a result, the stack counters for user elements C and D are incremented (rule 5), and the random number generators will again be initiated for user elements A and B. Assume that the result of the random number generation results in the stack counters being incremented for both user elements A and B ($L_t$=1). At this point, none of the user elements A, B, C, or D will transmit during time slot 3, and the base station will transmit an idle message to user elements A, B, C, and D. Since each of the user elements A, B, C, and D have stack counters that are greater than zero ($L_t>0$), the stack counters for each of the user elements A, B, C, and D are decremented (rule 6) such that user elements A and B will transmit during time slot 4 and the stack counters for user elements C and D are now set to one ($L_t$=1). Also assume that a user element E generates a packet to transmit. Since $L_t$=0 for the new packet for user element E, user elements A, B, and E will transmit during time slot 4, which will result in the base station 14 providing a collision message for feedback to user elements A, B, C, D, and E.

Thus, user elements A, B, and E will generate random numbers and user elements C and D will increment the stack counter. Assume that the result of the random number generation increments the stack counters for user elements B and E ($L_t$=1) and keeps the stack counter for user element A set to zero ($L_t$=0). As such, during time slot 5, only the packet for user element A is transmitted, which will result in a successful reception by the base station 14, which will provide a receive message back to user elements A, B, C, D, and E. Upon receiving the receive message, user elements B, C, D, and E will recognize that they did not transmit the packet corresponding to the feedback message, and decrement their respective stack counters (rule 7). As such, user elements B and E will have stack counters set to zero ($L_t$=0), and user elements C and D will have stack counters set to one ($L_t$=1). The resulting collision and collision feedback message from the base station 14 will result in user elements B and E running the random number generator, which may result in user element B's stack counter remaining at zero ($L_t$=0) and user element E's stack counter being set to one ($L_t$=1). The stack counters for user elements C and D will be incremented. Thus, during time slot 7, the packet for user element B will be successfully received by the base station 14, which will transmit a receive message back to user elements A, B, C, D, and E. The stack counters for user elements C, D, and E will be decremented, which will result in user element E's stack counter being set to zero ($L_t$=0) and the stack counters for user elements C and D being set to one ($L_t$=1).

During time slot 8, user element E will be able to transmit its packet without interference from the other user elements, which will result in a receive message being sent back to user elements A, B, C, D, and E. User elements C and D will decrement their stack counters, which will be set to zero ($L_t$=0), and will transmit their respective packets in time slot 9. The resulting collision will cause the base station 14 to send a collision message back to user elements A, B, C, D, and E. User elements C and D will then run their random number generators, which may result in the stack counter for user element C being set to zero ($L_t$=0), and the stack counter for user element D being set to one ($L_t$=1). During time slot 10, user element C will transmit its packet successfully, and the base station 14 will send a receive message back to user elements A, B, C, D, and E. User element D will decrement its stack counter to zero ($L_t$=0), and successfully transmit its packet during time slot 11.

Although the above example provides for 2-level splitting, the splitting may be arranged for any number of levels, n, wherein each level is associated with a different probability, which is realized by some form of random number generation. For example, in a 4-level splitting system, rules 4 and 5 from above would be modified as follows:

4. If $L_t$=0 and the feedback from the base station 14 is a collision message, then a random number generator is initiated to determine how to manipulate the stack counter:
  a. $L_{t+L}$=0 with probability R(0), R(0)>0;
  b. $L_{t+L}$=1 with probability R(1), R(1)>0;
  c. $L_{t+L}$=2 with probability R(2), R(2)>0;
  d. $L_{t+L}$=3 with probability R(3)=1−R(0)−R(1)−R(2), R(3)>0;
5. If $L_t$>0 and the feedback from the base station 14 is a collision message indicating that there was a collision during time slot t, then $L_{t+L}$=$L_t$+x, wherein x=1 through 3.

To assign priorities to various packet types or user elements 16, different levels of splitting may be provided in a common system. In one embodiment of the present invention, the random number generator function is essentially similar to providing each user element 16 with one or more coins, which are effectively flipped to determine whether or not to increase the stack counter, and in the case of multiple coins being provided to a user element, how much to increment the stack counter. For user elements 16 that only use a single coin, one could assume that for heads the stack counter remains at zero, wherein tails would result in incrementing the stack counter by one. For user elements with two coins, flipping both coins could result in four scenarios: two heads results in the stack counter remaining at zero, one head and one tail results in increasing the stack counter by one, one tail and one head results in increasing the stack counter by two, and two tails results in increasing the stack counter by three. In this manner, higher priority users would only be assigned one coin, wherein lower priority users could be assigned two coins. The random probability associated with the random number generator (or coin flipping) provides fairness within the priority structure. Other priority techniques may be used, wherein higher priority users have random number generators seeded such that the likelihood of not increasing the stack counter or minimizing the increase in the stack counter favors the higher priority users.

Figure 5:
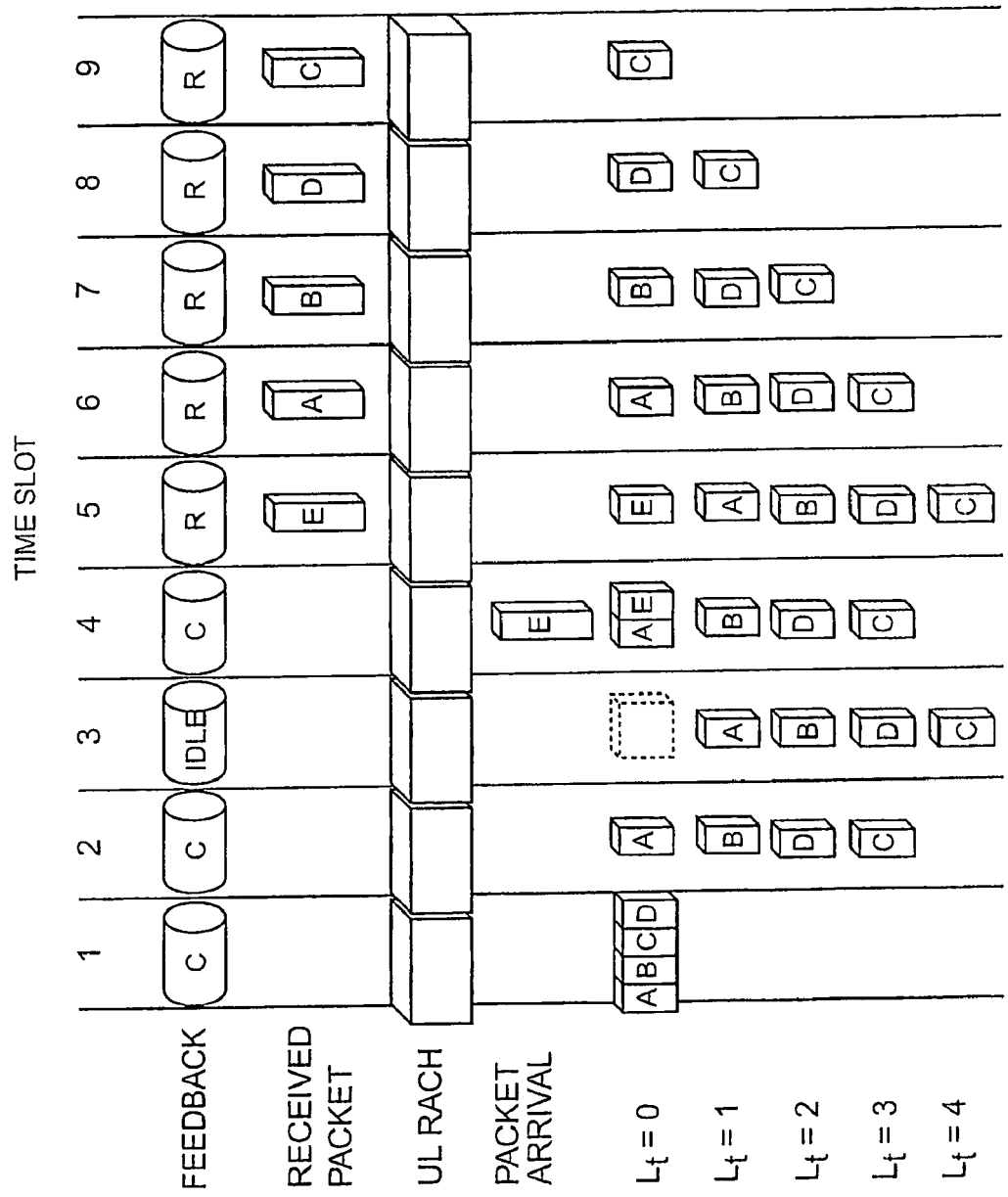
FIG. 5 illustrates the operation of a stack algorithm according to a second embodiment of the present invention.

As illustrated in FIG. 5, assume that user elements A and B are given a high priority, wherein user elements C and D are given a low priority. For the high priority user elements A and B, 2-level splitting is used, wherein for the low priority user elements C and D, a 4-level splitting system is used. Also assume that for the high priority user elements A and B the stack counter is set to either zero or one in response to a collision (rule 4), and that the stack counter for low priority user elements C and D is either set to two or three in response to a collision (rule 4). Thus, during time slot 1, each user element A, B, C, and D transmits its respective packet, which results in the base station 14 providing a collision message back to each of the user elements A, B, C, and D. Since each of the user elements receives a collision message in response to the transmissions, they will run their respective random number generators according to their respective splitting levels.

Assume that the high priority user elements A and B set their stack counters to zero ($L_t$=0) and one ($L_t$=1), respectively. Further assume that the low priority user elements C and D run their random number generators, resulting in setting the stack counter for user element D to two ($L_t$=2) and the stack counter for user element C to three ($L_t$=3). Thus, user elements A, B, D, and C have their stack counters set to zero, one, two, and three, respectively. Assume that although only user element A is transmitting during slot 2, there is sufficient interference that the base station 14 could not properly receive the packet, and a collision message was provided to user elements A, B, C, and D in response. As such, user element A will run the random number generator to see how to manipulate the stack counter (rule 4), and user elements B, D, and C will increment their respective stack counters (rule 5). Thus, time slot 3 is idle, and the base station 14 will respond with an idle message, resulting in each of the user elements A, B, D, and C decrementing their stack counters. Assume that user element E is now present and has a packet to transmit. At this point, user element E will have its stack counter set to zero ($L_t$=0), which will result in a collision of the packets for user elements A and E in time slot 4. The collision will result in a collision message being received from the base station 14, after which user elements A and E will run their random number generators to determine how to manipulate their stack counters. Assume that user element E is given high priority, and the random number generator resulted in the stack counter for user element E being set to zero ($L_t$=0), and that the same operation at user element A resulted in user element A's stack counter being set to one ($L_t=1$). Also assume that the stack counters for user elements B, D, and C were incremented by one. As such, during time slots 5, 6, 7, 8, and 9, the packets from user elements E, A, B, D, and C are received in progression as their respective stack counters decrement. From the above, those skilled in the art will recognize that providing multiple splitting levels can effectively assign different priority or quality of service levels for various packets or user elements 16, and provides a very successful random access channel protocol. To provide additional priority, the user elements 16 may repeat a packet transmission in a subsequent slot, prior to receiving feedback from the base station 14. Those user elements 16 that provide the repetitive transmissions will inherently increase their rate of success, and hence priority; however, the repetitive transmissions will result in an overall loss of throughput for the entire system.

As noted above, the present invention is also applicable to a multiple-channel system, wherein different ones of the user elements 16 may concurrently transmit using different channels. Thus, when the user elements 16 transmit on different channels, there are no collisions; however, when the user elements 16 transmit on the same channel at the same time, there will be collisions. In a multi-channel system, there are multiple channels available for every time slot. Since each user element 16 randomly selects a channel and slot, certain channels during any given time slot may be idle, may have multiple transmissions, or may have a single transmission.

Assume that each user element 16 randomly selects the channel over which a packet is to be transmitted at the beginning of each slot. As such, the user element 16 will recognize that a packet needs to be transmitted, randomly select a channel over which to transmit the packet, and then transmit the packet in the given slot. The base station 14 will attempt to receive the transmitted packet during each slot, forward successfully received packets in accordance with their destination addresses, and broadcast the feedback messages to the user elements 16. For the present invention, the base station 14 will scan all of the available channels, $n_c$, during a slot, and select a feedback message based on the relative number of channels in which there were successfully received packets and the number of channels in which there were conflicts or collisions. Assume that $S_t$ is the number of channels where packets were successfully received, and $C_t$ is the number of channels where there were collisions. Since the feedback from the base station 14 is not directed to a particular user element 16 and there are multiple channels that may have successful and unsuccessful transmissions for any given time slot, the present invention provides feedback from the base station 14 to control the random access channel protocol's stack algorithm based on the relationship between the number of successes and the number of collisions during any given time slot. In one embodiment, the feedback from the base station 14 may take one of three forms: a merge message, a stay message, and a split message. A merge message is sent when the ratio of successful channel to unsuccessful channels is relatively high, the split message is sent when the relative number of successful channels to unsuccessful channels is relatively low, and the stay message is sent when the ratio of successful channels to unsuccessful channels falls between the ranges defined for the split and merge messages. Accordingly, boundaries must be defined for the ratios such that the base station 14 may monitor the number of successful and unsuccessful channels and generate an appropriate feedback message. For example:

1. If R is equal to the ratio of successful channels to unsuccessful channels (collisions), then a split message may be provided when $0 \leq R \leq R_{LOW}$, wherein $R_{LOW}$ is the maximum ratio for the split message;
2. The stay message is sent when $R_{LOW} < R < R_{HIGH}$, wherein $R_{HIGH}$ is the threshold for sending the merge message; and
3. The merge message is sent when $R_{HIGH} < R$.

The ratios for $R_{LOW}$ and $R_{HIGH}$ are merely representative of how the ratios may be determined, and those skilled in the art will recognize that these values may be varied to control operation of the random access channel protocol. The stack algorithm is dependent upon the feedback from the base station 14, and operates as follows:

1. If a packet becomes available for transmission during slot t, then the stack counter for slot t+1 ($L_{t+1}$) is set to zero, and the packet is transmitted during slot t+1 using the selected channel;
2. If the stack counter is zero ($L_t=0$), the packet is not transmitted successfully in slot t, and the feedback message is a split message, then the stack counter for slot t+1 ($L_t=1$) is set to one of a defined number of splitting levels based on random number generation or other probability calculation. If there are only two levels for splitting, $L_{t+1}$ will equal zero or one;
3. If $L_t=0$, the packet is not transmitted successfully in slot t, and the feedback message is either a stay message or a merge message, then $L_{t+1}=0$;
4. If $L_t \geq 1$ and the feedback message is a split message, then $L_{t+1}=L_t+1$;
5. If $L_t \geq 1$ and the feedback message is a stay message, then $L_{t+1}=L_t$;
6. If $L_t \geq 1$ and the feedback message is a merge message, then $L_{t+1}=L_t-1$; and
7. If the packet is transmitted successfully, then begin processing the next packet.

FIGS. 6, 7, and 8 graphically illustrate rules for generating the feedback information for environments incorporating four, six, and eight channels, respectively. A point (X, Y) on the graphs indicates that X channels were successful and Y channels were unsuccessful due to collision or other interference. In FIG. 6, where a four-channel system is presented, when there are no unsuccessful channels and only successful channels, the merge message is sent as feedback from the base station 14. Points that are below the split line belong to the region where the stay message is provided as feedback. Points that are on the split line and above it will result in a split message being sent as feedback. Similar rules apply for the graph shown in FIG. 7. With respect to the graph of FIG. 8, a merge line is provided, wherein the stay message is sent for those points below the split line and above the merge line. All points on or below the merge line will result in a merge message being sent as feedback from the base station 14.

Based on the above, the random access channel protocol can be enhanced for both single and multi-channel systems by implementing stack algorithms that incorporate random number generators or similar means for controlling the stack algorithm in light of feedback from the base station 14. Further, additional priority may be provided by assigning different splitting levels within the stack algorithm for different types of packets or different user elements 16. The following outlines further options for assigning different priorities to different packets or user elements 16, as well as ensuring that the likelihood of a successful retransmission increases each time a packet is retransmitted.

Figure 9A:
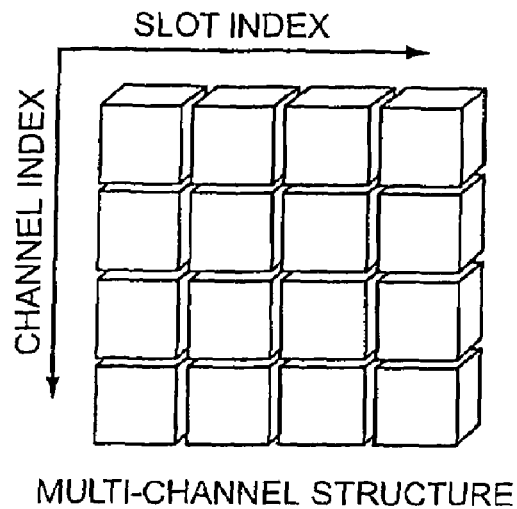
Figure 9B:
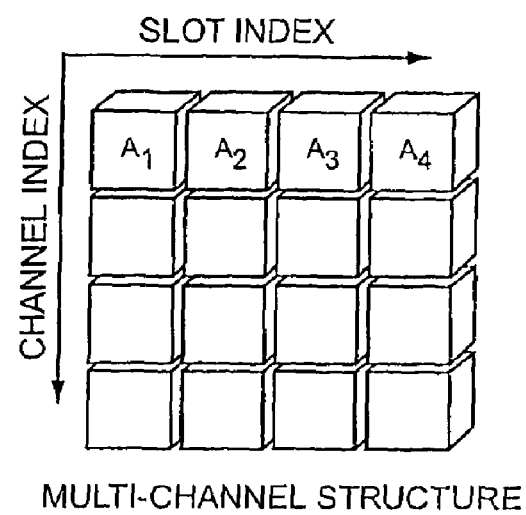
Figure 9C:
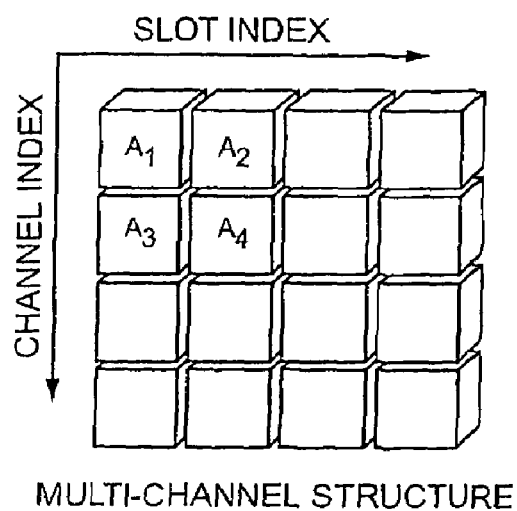

With reference to FIGS. 9A-9C, multiple channels over multiple slots are illustrated. FIG. 9A shows the available number of channels for each slot. In this system, each user element 16 may function to transmit different packets ($A_1$-$A_4$) during different time slots and within different channels.

Figure 9D:
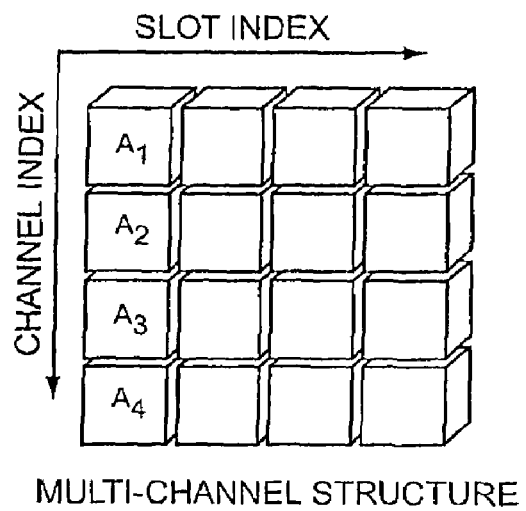

For example, in FIG. 9B, packets $A_1$-$A_4$ are sequentially transmitted within a given channel over four consecutive time slots. In FIG. 9C, packets $A_1$-$A_4$ are transmitted using two channels over two time slots. Alternatively, packets $A_1$-$A_4$ could be transmitted during the same time slot within four different channels, as illustrated in FIG. 9D.

Figure 9E:
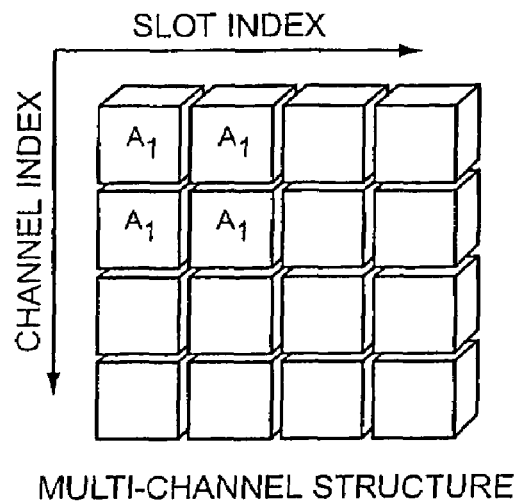
Figure 9F:
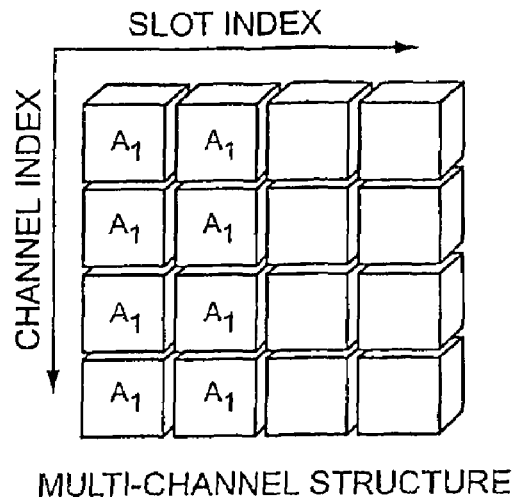
Figure 9G:
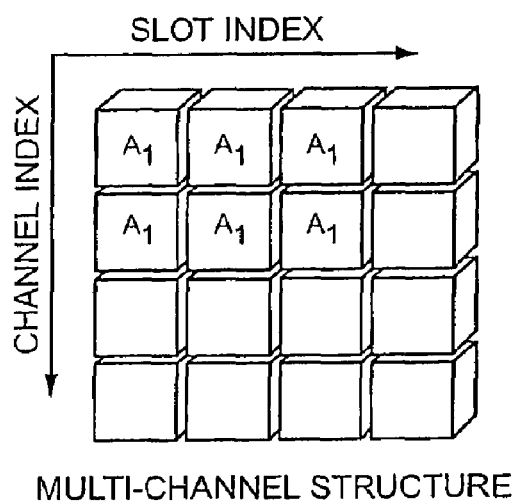

In an effort to increase priority, redundant packets may be transmitted over multiple slots and multiple channels within the multiple channel system, as illustrated in FIGS. 9E-9G. In FIG. 9E, redundant packets are transmitted in two channels over two time slots. For even higher priority, the same packet may be transmitted over each of the four channels over the first two time slots, as illustrated in FIG. 9F. An intermediate option is shown in FIG. 9G, which entails sending the same packet in two channels over three time slots. The relative priority among the various user elements 16 or particular types of packets will directly depend on the number of redundant copies of the packet that are transmitted in other time slots or channels.

In addition to sending multiple copies of packets, the relative signal strength between competing transmissions often bears on the odds of a successful transmission. As such, the present invention may also implement power ramping strategies for consecutive retransmissions. For example, the first transmission of a packet may use a low transmission power. If the transmission is not successful, the power for the second transmission is incremented to a higher level. If the second transmission is not successful, the following transmission is provided at an even higher power, and so forth. The power ramping may be incorporated within the techniques provided above for each retransmission of a packet. As noted, the retransmissions may take place in different channels, and may or may not take place in consecutive time slots, depending on the relative operation of the stack algorithm. Further, different packets that are consecutively transmitted may be transmitted during different time slots and using different channels, each of which may be selected just prior to transmission. In essence, packets transmitted from any given user element 16 may hop from one channel to another from slot to slot.

In certain embodiments, the headers and preambles may be transmitted at different times and over different channels based on the information being transmitted under the control of the base station 14. Further, allocation of the communication channels can dynamically be modified to accommodate the communication needs of the communication environment. For example, the relative amount of data associated with each packet and the frequency of access will bear on the amount of channel resources that need to be allocated for access and for actual traffic. As illustrated in FIGS. 10A-10C, the channels can be allocated in numerous ways, as well as being reallocated in a dynamic fashion. As illustrated in FIG. 10A, for a short burst of packets that is frequent in nature, a greater number of the available channels are allocated for access, while fewer are allocated for actual traffic. If the converse is true, as illustrated in FIG. 10B, a fewer number of channels are allocated for access and more channels are allocated for traffic. The random access channel protocol will then operate within these confines, which are controlled by the base station 14. If there is a combination of a long burst and a short burst of traffic with relatively minimal access, the channels may be allocated for access, short burst of traffic, and long burst of traffic, as shown in FIG. 10C.

With reference to FIG. 11, certain groups of time slots and the channels associated therewith may be allocated for access channels, while slots during a different period of time are allocated for traffic channels. To allow different levels of priority, more channels may be allocated for high priority users than low priority users, wherein the high and low priority user elements 16 are aware of the channels to use for gaining access and those available for traffic. Again, the random access channel protocol and the corresponding stack algorithms described above will simply operate within these confines, which again are controlled by the base station 14. Further, newly active user elements 16 may automatically be assigned as low priority users, wherein existing user elements 16 are moved to a higher priority. Further, retransmissions may warrant a higher priority than initial transmissions, in addition to simply allowing certain user elements 16 or certain types of packets to dictate priority. Although wireless environments are depicted, the present invention is applicable to both wireless and wired types of communication systems incorporating any type of multiple access technology in a single or multi-channel environment. Those skilled in the art will recognize that the term "channels" refers to any communication means wherein data can be transmitted simultaneously or relatively simultaneously based on code division, time division, or frequency division techniques, or a combination thereof.

Those skilled in the art will recognize improvements and modifications to the preferred embodiments of the present invention. All such improvements and modifications are considered within the scope of the concepts disclosed herein and the claims that follow.

What is claimed is:

1. A user element for facilitating random access communications comprising:
   a) receive circuitry;
   b) transmit circuitry; and
   c) control circuitry associated with the receive and transmit circuitry and configured to:
      i) transmit a packet stored in a buffer to an access point during a time slot when a stack counter is a nominal value; and
      ii) adjust the stack counter when feedback information received from the access point is indicative of the packet needing to be retransmitted, the feedback information sent to a plurality of user elements in a communication environment.

2. The user element of claim 1 wherein the control circuitry is further configured to implement one of a plurality of random number generators to generate a random number, which determines a relative amount by which the stack counter is adjusted such that different user elements will have different priorities based on the one of the plurality of random number generators implemented.

3. The user element of claim 2 wherein the different ones of the plurality of random number generators have a different number of possible outcomes such that a relative priority is decreased as the number of possible outcomes is increased.

4. The user element of claim 2 wherein the control circuitry is further configured to retransmit the packet at an increased power level when the feedback information is indicative of the packet needing to be retransmitted.

5. The user element of claim 1 wherein the control circuitry is further configured to select channels from a plurality of channels to use for transmitting packets to the access point on a packet-by-packet basis and transmit the packets on the selected channels.

6. The user element of claim 1 wherein the feedback information is indicative of a relative number of successful channels in which packets were properly received to a relative number of unsuccessful channels in which packets were not properly received, and the control circuitry is adapted to determine whether to retransmit the packet and how to adjust the stack counter to determine when to retransmit the packet based on the feedback information.

7. The user element of claim 6, wherein the feedback information is one of three messages selected from a group consisting of a first message indicating a relatively large ratio of successful to unsuccessful channels, a second message indicating an intermediate ratio of successful to unsuccessful channels, and a third message indicating a relatively low ratio of successful to unsuccessful channels.

8. The user element of claim 1 wherein the control circuitry is further configured to select channels from a plurality of channels to use for transmitting packets to the access point based on a relative length of the packets to be transmitted.

9. The user element of claim 1 wherein the control circuitry is further configured to select channels from a plurality of channels to use for transmitting packets to the access point based on a frequency in which access is required.

10. The user element of claim 1 wherein the control circuitry is further configured to select channels from a plurality of channels to use for transmitting packets to the access point based on a volume of data to be transmitted.

11. The user element of claim 1 wherein the control circuitry is further configured to redundantly transmit the packet over multiple channels to increase a relative priority of the user element.

12. The user element of claim 1 wherein the control circuitry is further configured to redundantly transmit the packet during multiple time slots to increase a relative priority of the user element.

13. The user element of claim 1 wherein the control circuitry is further configured to redundantly transmit the packet over multiple channels and during multiple time slots to increase a relative priority of the user element.

14. An access point for facilitating random access communications comprising:
    a) receive circuitry;
    b) transmit circuitry; and
    c) control circuitry associated with the receive and transmit circuitry and configured to:
        i) receive packets transmitted via at least one of a plurality of channels from a plurality of user elements during a time slot;
        ii) determine a number of successful channels in which packets were properly received during the time slot;
        iii) determine a number of unsuccessful channels in which packets were not properly received during the time slot; and
        iv) transmit a feedback message based on a relative number of successful channels in which packets were properly received to a relative number of unsuccessful channels in which packets were not properly received.

15. The access point of claim 14, wherein the feedback message is one of three selected from a group consisting of a first message indicating a relatively large ratio of successful to unsuccessful channels, a second message indicating an intermediate ratio of successful to unsuccessful channels, and a third message indicating a relatively low ratio of successful to unsuccessful channels.

16. A method for facilitating random access communications from a user element comprising:
    a) transmitting a packet stored in a buffer to an access point during a time slot when a stack counter is a nominal value; and
    b) adjusting the stack counter when feedback information received from the access point is indicative of the packet needing to be retransmitted, the feedback information sent to a plurality of user elements in a communication environment.

17. The method of claim 16 further comprising implementing one of a plurality of random number generators to generate a random number, which determines a relative amount by which the stack counter is adjusted such that different user elements will have different priorities based on the one of the plurality of random number generators implemented.

18. The method of claim 17 wherein the different ones of the plurality of random number generators have a different number of possible outcomes such that a relative priority is decreased as the number of possible outcomes is increased.

19. The method of claim 17 further comprising retransmitting the packet at an increased power level when the feedback information is indicative of the packet needing to be retransmitted.

20. The method of claim 16 further comprising selecting channels from a plurality of channels to use for transmitting packets to the access point on a packet-by-packet basis and transmitting the packets on the selected channels.

21. The method of claim 16 wherein the feedback information is indicative of a relative number of successful channels in which packets were properly received to a relative number of unsuccessful channels in which packets were not properly received, and further comprising determining whether to retransmit the packet and how to adjust the stack counter to determine when to retransmit the packet based on the feedback information.

22. The method of claim 21, wherein the feedback information is one of three messages selected from a group consisting of a first message indicating a relatively large ratio of successful to unsuccessful channels, a second message indicating an intermediate ratio of successful to unsuccessful channels, and a third message indicating a relatively low ratio of successful to unsuccessful channels.

23. The method of claim 16 further comprising selecting channels from a plurality of channels to use for transmitting packets to the access point based on the relative length of the packets to be transmitted.

24. The method of claim 16 further comprising selecting channels from a plurality of channels to use for transmitting packets to the access point based on a frequency in which access is required.

25. The method of claim 16 further comprising selecting channels from a plurality of channels to use for transmitting packets to the access point based on a volume of data to be transmitted.

26. The method of claim 16 further comprising redundantly transmitting the packet over multiple channels to increase the relative priority of the user element.

27. The method of claim 16 further comprising redundantly transmitting the packet during multiple time slots to increase a relative priority of the user element.

28. The method of claim 16 further comprising redundantly transmitting the packet over multiple channels and during multiple time slots to increase a relative priority of the user element.

29. A method for facilitating random access communications from an access point comprising:
    a) receiving packets transmitted via at least one of a plurality of channels from a plurality of user elements during a time slot;

b) determining a number of successful channels in which packets were properly received during the time slot;
c) determining a number of unsuccessful channels in which packets were not properly received during the time slot; and
d) transmitting a feedback message based on a relative number of successful channels in which packets were properly received to a relative number of unsuccessful channels in which packets were not properly received.

30. The method of claim 29, wherein the feedback message is one of three selected from a group consisting of a first message indicating a relatively large ratio of successful to unsuccessful channels, a second message indicating an intermediate ratio of successful to unsuccessful channels, and a third message indicating a relatively low ratio of successful to unsuccessful channels.

* * * * *